Oct. 24, 1950
W. J. GILMORE
2,526,740
CABLE CONNECTOR
Filed Feb. 16, 1945
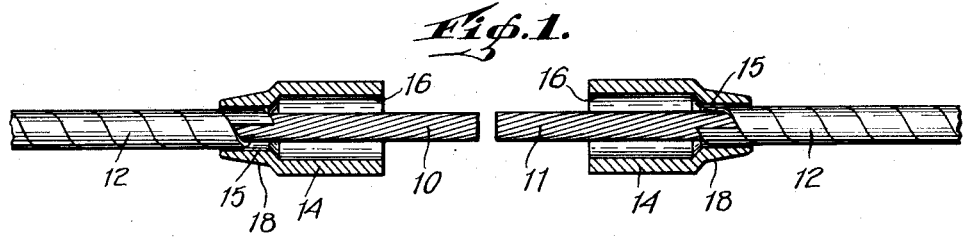
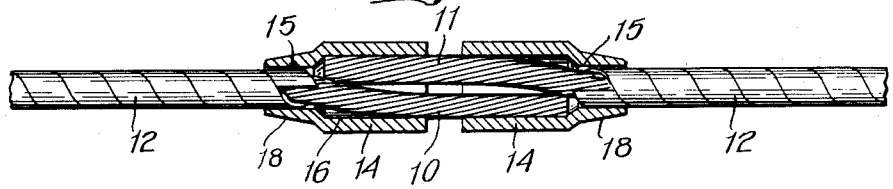
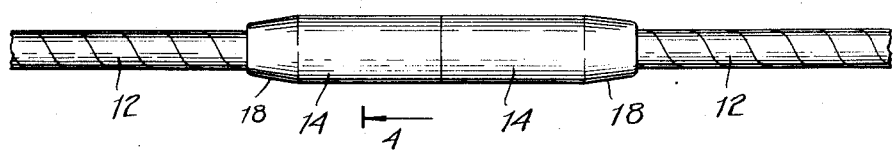
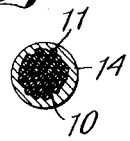
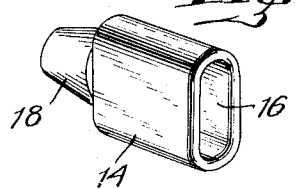
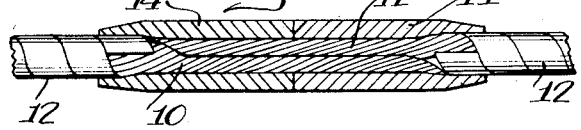
INVENTOR
WILLIAM J. GILMORE
BY
*Frederick P. Duncan*, ATTORNEY

Patented Oct. 24, 1950

2,526,740

UNITED STATES PATENT OFFICE 2,526,740

CABLE CONNECTOR

William J. Gilmore, Adrian, Mich., assignor to American Chain & Cable Company, Inc., Bridgeport, Conn., a corporation of New York Application February 16, 1945, Serial No. 578,175

3 Claims. (Cl. 140—111)

1

The invention relates to a connector which secures or couples together the two cable ends. The cable may be armored in which case the armor is stripped from the ends; however, the connector is equally suitable for connecting together cable ends which are not armored. The invention also relates to a method of connecting together the cable ends.

It is an object of the invention to construct a new and novel cable connector or connection.

Another object is to construct a cable connection of small diameter and relatively short length which has a strength at least equal to that of the cable.

Another object of the invention is to construct a cable connection of two ferrules each of which has initially an elliptical bore to receive the two ends of the cables in overlap relation after which swaging of the assembled connection reduces the diameter and also brings the projecting ends of the cable into alignment.

Another object is to provide a method of connecting together two cable ends.

Other objects of the invention will be apparent from the following description taken in connection with the accompanying drawings illustrating a preferred embodiment thereof in which:

Figure 1 is a longitudinal section through the connector ferrules with the cable ends projected through one ferrule and in spaced relation preparatory to inserting the cable ends into the other ferrule.

Figure 2 is a longitudinal section through the connector with the cable ends in both ferrules prior to swaging.

Figure 3 is a view of the connector after swaging.

Figure 4 is a cross-section on line 4—4 of Fig. 3 through the connector after swaging with the cable ends secured therein.

Figure 5 is a perspective view of a ferrule showing the initial oval bore therein.

Figure 6 is a longitudinal section through the connector with the cable ends in place after swaging.

The cables 10 and 11, the ends of which are fastened together by the connector and form a part of the connection may be of any known kind and is usually made up of strands of smaller diameter wire wound or twisted together. The cable may be of a solid wire although the stranded cable is preferred. The cable may have an armor 12 spirally wound around the strands of the cable although the connector operates equally well without the armor. In assembling the connection, the armor is stripped from the ends of the cable a distance sufficient so that the armor projects partly into the connector as will appear more fully hereinafter. Such cables are used in towing targets.

The cable connection or connector comprises a pair of like ferrules 14 one end of which has an entrance bore 15 of generally cylindrical form and the other end has an elliptical bore 16 extending therein to a substantial depth so that the major portion of the bore in each ferrule is oval. The elliptical bore is obtained in any suitable fashion, the simplest method of making it being to initially provide a cylindrical bore of proper diameter in the ferrule and then flatten the ferrule which reduces the bore to an oval or elliptical form. This elliptical bore becomes the cable gripping bore after swaging. In this flattening operation the entrance bore 15 necessarily is flattened somewhat although it is preferable to have this bore remain cylindrical and it is not necessary that it be flattened. The elliptical bore is of such size that it receives the two ends of the cables 10 and 11 with the armor removed.

In assembling the connector and the cable ends together the cable 10 is projected into the entrance bore 15 of one ferrule 14, through its elliptical bore, and into the elliptical bore of the second or right hand ferrule 14, the two ferrules being positioned with their elliptical bores facing towards each other. The other cable 11 is projected through the cylindrical bore of the right hand ferrule so that it projects through the elliptical opening of the right hand ferrule and also through the elliptical bore of the left hand ferrule as shown in Figure 2. The two ferrules are spaced apart a short distance as shown in the figure, the reason for which will be discussed more fully hereinafter. The armor 12 of each cable projects into the cylindrical entrance bore only of its respective ferrule.

With the cables and ferrules assembled together, the ferrules are swaged which may be done by hammering between cylindrical dies, the dies having a diameter corresponding approximately to the resultant diameter desired in the swaged ferrules and connection. The swaging reduces the outer and inner dimension of the two ferrules and the outer elliptical form to cylindrical form. The swaging reduces the size of the ferrules to a substantially less dimension than their initial elliptical form. In the swaging operation the ends of the cables are mashed into each other so that the cable ends are firmly held together and are firmly held within the swaged ferrules. Possibly some intermingling of the cable strands occurs. In the swaging operation the ferrules also elongate and close up the initial space between them so that the ferrules eventually appear with their ends abutting. When the swaging has been completed the cable ends are firmly gripped together within the ferrules and each cable is in alignment or substantial alignment with the connector or swaged ferrules. The connection is short enough and of such a diameter that it will pass around a pulley, and also has a diameter small enough so that a target will pass thereover.

It is desirable that the entrance end and bore of the ferrules be swaged less than the rest thereof. It is for this reason that the end of the ferrule has initially a reduced portion 18 of reduced diameter which is not swaged until the diameter of the balance of the ferrule has been substantially reduced. This reduced portion has a double function, first so that reduced swaging is applied to that portion of the ferrule which receives the armor and secondly so that the entrance end of the connection will be bell-mouthed or tapered. The bell-mouthed shape at the ends of the connection avoids undue stress or strain being created in the cables during the swaging operation and also avoids a point where undue stress can occur when under tension at the point of entry into the connection. The latter is the more important of the two purposes provided by the reduced portion 18. Although the swaging at the entrance end of each ferrule is reduced by the reduced diameter, it is sufficient nevertheless to grip the armor of the cable.

This invention is presented to fill a need for improvements in a cable connector. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A method of producing a cable connection comprising inserting a pair of cable ends in a pair of ferrules each having a cylindrical bore at one end and initially an elliptical bore extending from the other end for a substantial portion of the length of the ferrule so that each cable end passes through the cylindrical bore of one ferrule and extends through the elliptical bores of both ferrules, the ferrules being spaced from each other, and then swaging the ferrules throughout their length with the cables therein until they are substantially reduced in size and cylindrical to grip the ends of both cables and the elongation of the ferrules induced by the swaging closes the space between the ferrules.

2. A method of producing a cable connection comprising inserting a pair of cable ends in a pair of ferrules each having a cylindrical bore at one end and initially an elliptical bore extending from the other end for a substantial portion of the length of the ferrule so that each cable end passes through the cylindrical bore of one ferrule and extends through the elliptical bores of both ferrules, the ferrules being spaced from each other, and then swaging the ferrules from each end toward the center of the connection throughout the length of each ferrule with the cables therein until they are substantially reduced in size and cylindrical to grip the ends of the both cables and the elongation of the ferrules induced by the swaging closes the space between the ferrules.

3. A method of producing a cable connection with armored cable comprising removing the armor from the end of each cable, inserting the pair of cable ends in a pair of spaced ferrules each having a cylindrical bore at one end and initially an elliptical bore extending from the other end for a substantial portion of the length of the ferrule so that each cable end and the armor passes through the cylindrical bore of one ferrule and the bare cable extends through the elliptical bores of both ferrules, and then swaging the ferrules throughout their length with the cables therein until they are substantially reduced in size and cylindrical to grip the ends of the both cables and the armor and the elongation of the ferrules induced by the swaging closes the space between the ferrules.

WILLIAM J. GILMORE.

REFERENCES CITED

The following references are of record in the file of this patent:

UNITED STATES PATENTS

| Number | Name | Date |
|---|---|---|
| 116,021 | Cary | June 20, 1871 |
| 191,339 | Hayden | May 29, 1877 |
| 646,573 | Gartner | Apr. 3, 1900 |
| 650,862 | McTighe | June 5, 1900 |
| 1,919,347 | Sunderland | July 25, 1933 |
| 1,953,891 | Andrew | Apr. 3, 1934 |
| 2,259,261 | Miller et al. | Oct. 14, 1941 |

FOREIGN PATENTS

| Number | Country | Date |
|---|---|---|
| 193,065 | Great Britain | Feb. 12, 1923 |